April 25, 1950  M. WALLACE ET AL  2,505,314
PANORAMIC POSITION INDICATOR
Filed Dec. 6, 1945  8 Sheets-Sheet 1
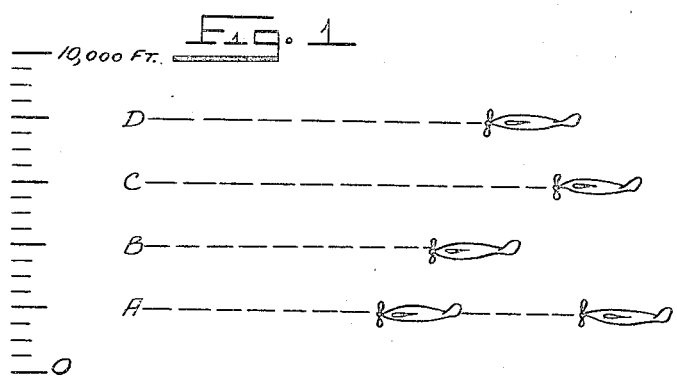
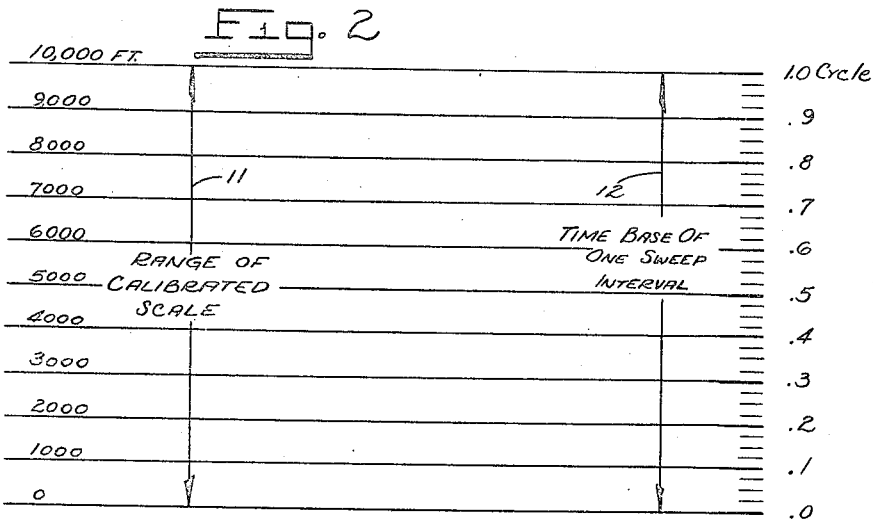
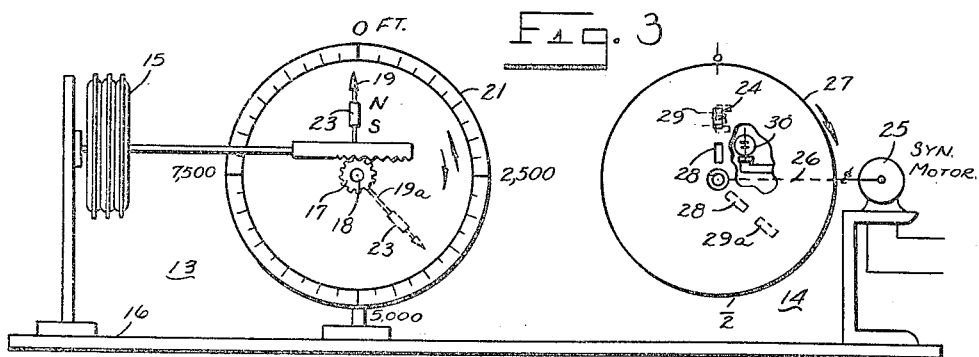
INVENTOR.
Marcel Wallace
& William Lew Lang Wu
BY
Julius E. Foster April 25, 1950

M. WALLACE ET AL 2,505,314

PANORAMIC POSITION INDICATOR

Filed Dec. 6, 1945

INVENTOR.
Marcel Wallace
BY & William Deu-Liang Wu
Julius C. Foster

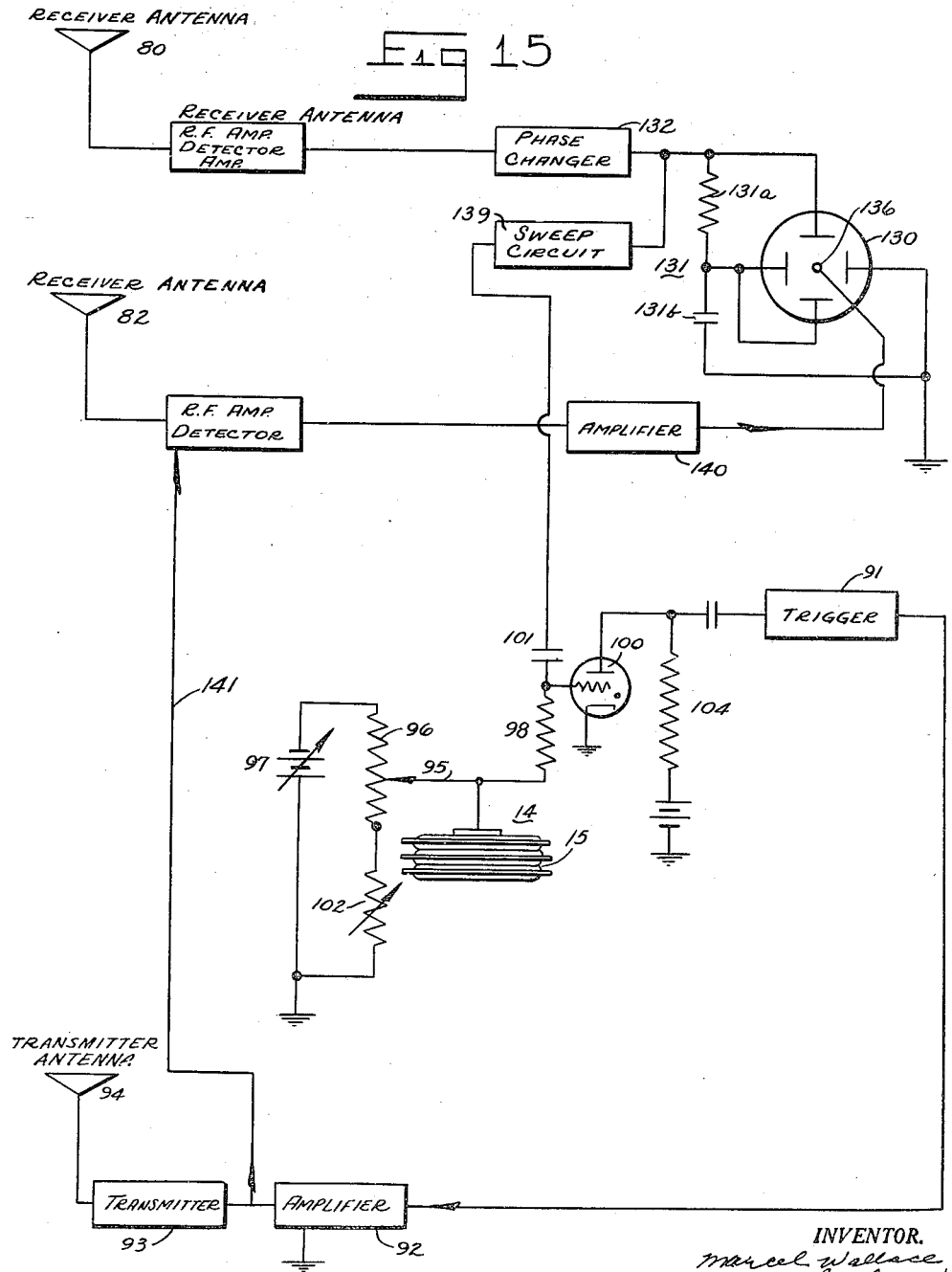

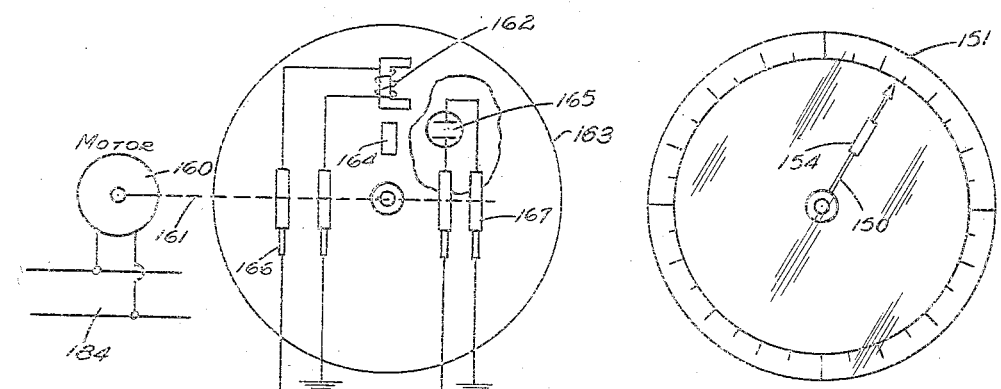
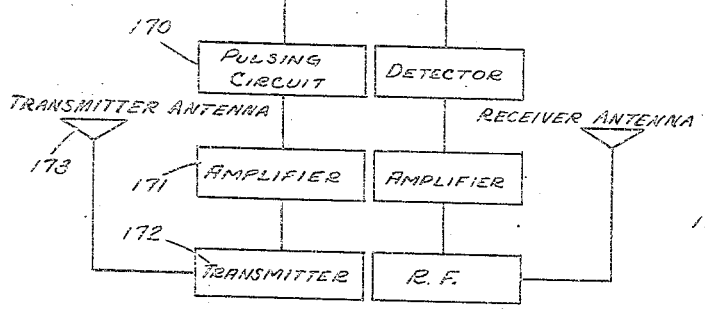
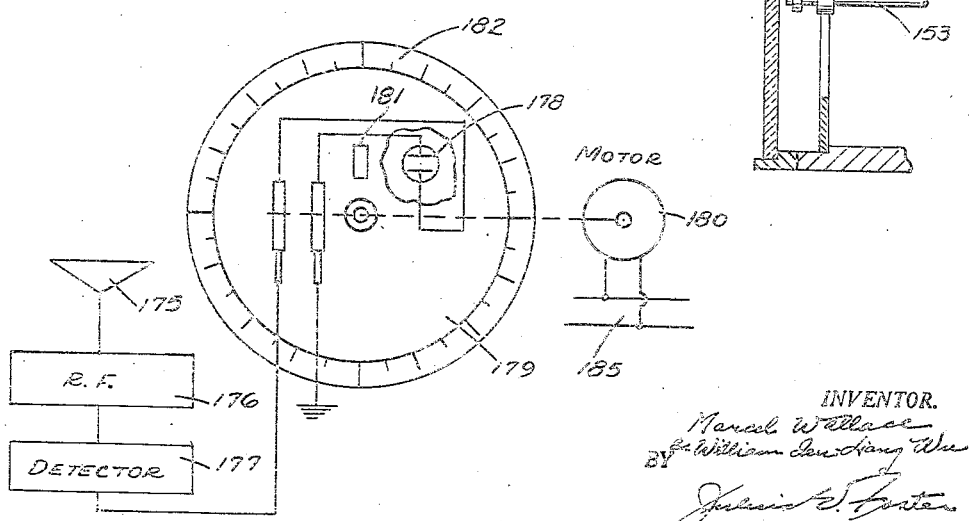

Patented Apr. 25, 1950

2,505,314

UNITED STATES PATENT OFFICE 2,505,314

PANORAMIC POSITION INDICATOR

Marcel Wallace, East Port Chester, Conn., and William Ieu-Liang Wu, New York, N. Y., assignors, by direct and mesne assignments, to Panoramic Radio Corporation, New York, N. Y., a corporation of New York Application December 6, 1945, Serial No. 633,138

18 Claims. (Cl. 250—2)

This invention relates to a panoramic system for indicating the elevation and location of aircraft.

One object of this invention is to provide a simple system for indicating to a pilot the presence and the relative altitudes of other craft or objects in the space about him, to enable him to avoid collisions.

Another object of this invention is to provide a single instrument to show a pilot the elevation of his own craft and the elevations of other craft or objects in the space about him.

Another object of this invention is to provide a system whereby radio beacons may be located at and on traffic hazards, such as hills, mountains, buildings, and the like, to give the pilot of an aircraft a warning indication of its presence and elevation, both absolute and relative to his own.

Another object of this invention is to provide an indiciating system whereby a control station located on the ground may have a continuous visual panoramic indication of the respective elevations of the craft within its region of control.

Another object of this invention is to provide a simple system whereby aircraft and ground stations equipped with the apparatus described herein may have continuous panoramic indications of the presence and of the elevations of each other.

Another object of this invention is to provide a simple method and system of operation for indicating and displaying a panoramic view of the relative and absolute elevations of a plurality of aircraft in a predetermined region, on a display surface on each aircraft and in control ground stations.

Another object of this invention is to provide means for indicating the traffic at airports and thereby permit expeditious handling of the aircraft from the control station of the port.

Another object of this invention is to provide a simple system for continuously indicating the position of a remotely located movable member.

In air traffic, the ends of speed and of safety can be best achieved if the locations of all aircraft are known continuously by operators at ground control stations and by the pilots themselves on the aircraft. The most desirable and most effective knowledge would be that which could be derived from a continuously operating display system showing the instantaneous relative and absolute positions of aircraft in the traffic zones.

As indicated above, an object of this invention is to provide such a system. In mountainous territory where weather conditions frequently obscure the regular guide lights, it would be a positive contribution to safety if the pilot could have an indication of the height of the mountains where he is flying, relative to his own elevation. An object of this invention is to provide such a system.

In the operation of this system, each aircraft, and where desired, a ground station also, is provided with similar equipment. An altimeter with a pointer and a calibrated scale shows the elevation of the carrying craft or ground station. Associated equipment co-operates with the altimeter to show the respective elevations of other craft by the same altimeter instrument. Such associated means comprise a time-measuring device to establish a basic time interval of fixed duration that is the same for all stations, whether on the ground or on an aircraft.

The time-measuring device converts the time interval to a linear dimension that is made equal to the dimension of the altimeter scale. A point on the time-interval dimension thus corresponds to a point on the altimeter scale.

In mechanical form, the time-measuring device may be a clock or a reed-controlled direct-current motor operating at constant speed, or a synchronous motor operating at a constant frequency, fixed for the entire system. The time interval is preferably established as the time of one rotation of a driven shaft, which may be direct-driven or geared up or down. An element fixed to the shaft, and rotated thereby, serves as a timing element. In electronic form, the time-measuring apparatus may be a cathode ray tube and an oscillator of fixed frequency to continuously and repetitively supply a sweep voltage to one set of the deflecting plates of the tube, through successive time intervals of constant fixed duration. In this case the swept cathode ray provides the time element.

As indicated, each station, on the ground or on an aircraft, is provided with a device for measuring the elevation of the aircraft or of the station. Such elevation is then indicated by a suitable element that assumes a position according to the elevation being measured. An aneroid cell or Bourdon tube may be utilized to position a pointer in a system of a mechanical type. For an electronic system, the elevation may be measured by any suitable electronic-type altimeter and the measurement indicated by a point function, such as potential or frequency.

For the purpose of this invention, the time function is defined as a fixed time interval of constant duration throughout the entire system. Upon conversion to a linear dimension, that interval can therefore be used as a standard of measurement for the system. The beginning of each interval is identified and located at each station manually or automatically by reference to a synchronizing signal pulse. Each interval is then available as a known measuring stick, when properly calibrated. The quantity to be measured in this case is elevation. The linear dimension to which the time interval is converted, is therefore calibrated in units of elevational measurement for the range within which information is desired.

In one form of the invention, to be described herein, the timing device on each aircraft is a synchronous motor, and the timing element rotated thereby is a disc provided with a narrow radial slot and a neon lamp behind the slot to illuminate the slot under certain conditions, and thus to cause the slot to function as a pointer. The illumination is by pulse energization of the neon lamp and the action of the disc is therefore stroboscopic. The source of the pulse is an altimeter at the local station or at an external station.

The time required for one rotation of the disc is the basic fixed time interval for the system. Since the path of the timing element is circular, any convenient point may be taken as the zero point or beginning of the time interval as measured on the circular path of that point. The slot in the disc may be considered a hand or pointer. A scale is mounted adjacent the disc and is either circular or annular to encompass an entire circle adjacent the path of the slot in the disc. The scale thus physically measures one basic time interval in terms of a circle as a linear dimension, and, in addition, is calibrated for the desired range of elevational units. For simplicity, the dimension will now be considered by reference to the central angle of rotation. The angular movement of the disc through one rotation, or 360 degrees, will be dimensionally equivalent to the duration of one unit time interval.

In order to give significance to the position of the elevation-indicating element, the scale is calibrated according to the movement of the elevation-indicating element. The scale in this form of the invention is essentially an element of the elevation-indicating apparatus and is mounted integrally with that apparatus so the entire elevation-indicating apparatus may be adjustably positioned relative to the synchronously driven disc.

The calibrated relationship between the scale and its elevation-indicator is not disturbed by such adjustment, but permits the zero point of the scale to be manually positioned for proper phase position at a selected point of the disc slot as the zero point of the time interval. The slot path and the elevation scale range are thus made co-extensive and properly phased, and the slot at any position in its path will indicate or read a corresponding elevation on the scale, whenever its associated neon lamp is energized.

As indicated above, the neon lamp is arranged to be energized by a voltage pulse when the associated slot reaches a position adjacent the scale corresponding to the elevation of an external plane. Where several timing pulses are received, from several external planes, the neon lamp will be lighted for each of such pulses to illuminate the slot when the slot reaches each position in its path corresponding to the elevation of an external craft, in response to the reception of a corresponding signal.

In one modification of the system, the motor-driven disc is provided with only one slot and one neon lamp to illuminate it, for self-position, indicating pulses as well as for pulses from external craft. A switch operation by the pilot identifies the self-position-indicating pulse and elevation.

In a second modification, the disc is provided with two slots radially disposed, and two neon lamps, each disposed behind one of the slots. One neon lamp receives the self-position-indicating pulse; the other receives the external position-indicating pulses.

For proper operation of the system, all the synchronous motors should have the proper phase positions relative to the associated calibrated scale of the elevation indicator. Provision is therefore made to permit relative phase adjustment, between each motor and the calibrated scale of the associated elevation-indicator, to be made by the pilot at the beginning of each flight, according to a common predetermined synchronizing signal available for the system.

In the case of the electronic system, one sweep interval provides the fixed basic or reference timing interval. Those intervals are also synchronized and phased at all stations, both on the ground and on all aircraft, so that any position-indicating impulses received on any aircraft will be properly related to the timing sweep and correspondingly positioned on a reference sweep interval base line on a cathode ray tube, calibrated to a selected range of elevations.

Since this system provides a local indication of the position of a remote altimeter indicator, the system obviously may be used to transmit indications of movable members generally where they may be related to a calibrated scale or path; and, by extension, the system may be used to transmit instrument readings from or to a remote station.

The general principles and operation of the invention are explained and shown in greater detail in the following description and drawings, in which Figure 1 is a schematic view of an air traffic zone, showing schematically several aircraft between ground and ten thousand feet elevation;

Figure 2 is a schematic view showing the linear equivalence between the dimension of the calibrated scale of the elevation-indicator and the equivalent dimension of a basic or reference sweep time interval.

Figure 3 is a schematic view showing the various elements to be combined in a mechanical panoramic indicating unit;

Figure 15 is a block diagram showing how a polar tube is energized and controlled to permit proper phasing of a circular trace;

Figure 16 is a front elevational view of an instrument showing its pointer in a reading position with respect to a calibrated scale, with the pointer being provided with an electromagnet to permit a moving search coil to locate the magnet;

Figure 17 is a side view showing longitudinally, and in section, the instrument in Figure 16;

Figure 18 is a schematic and diagrammatic view of a motor-operated pick-up coil by means of which a pulse may be generated when the coil locates the electromagnet on the pointer of the instrument in Figure 16, so that the pulse may be utilized to transmit intelligence relative to the position of the pointer.

Figure 4:
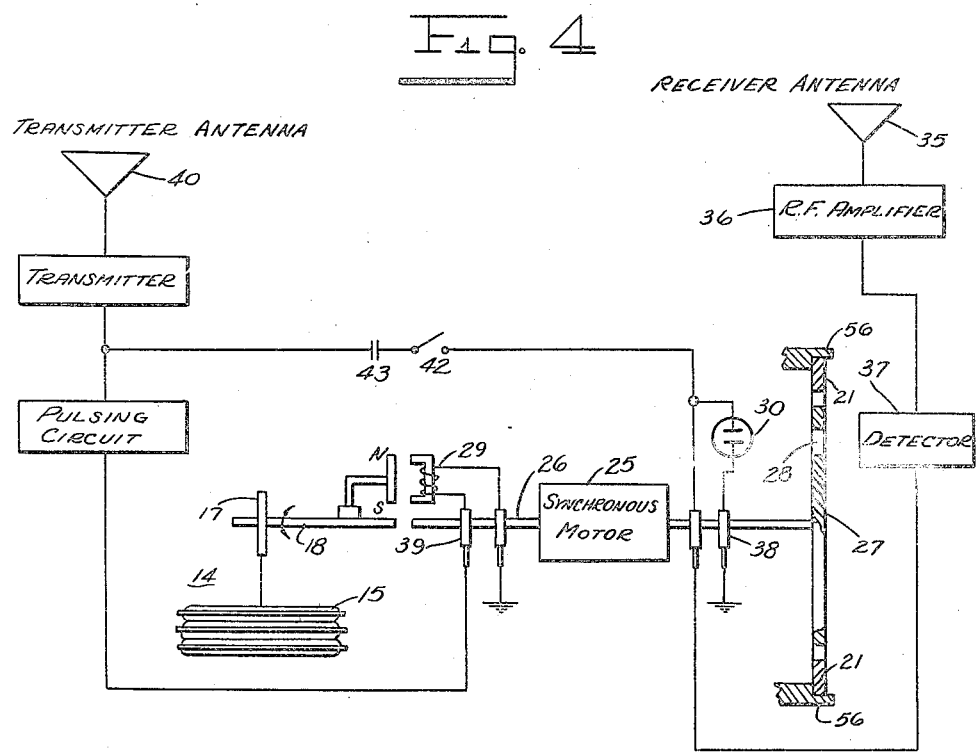
Figure 4 is a schematic and block diagram of the equipment at one station of a system operating according to the present invention.

As shown in Fig. 1, several aircraft may be flying in a traffic zone, or be otherwise not far apart, at various elevations, as indicated by the dotted lines, A, B, C and D, within a range, for example, of 10,000 feet. The spacing shown between the aircraft is for convenience of illustration and bears no direct relation to the calibrated scale shown. If each pilot could know of the presence of the other craft, and have some indication of their relative locations, greater safety would result.

In order to provide such information, the present invention utilizes a reference time base and establishes a basic operating relationship of linear equivalence and registration, as shown schematically in Figure 2, between a linear dimension 11, corresponding to the length of an elevation-indicating scale calibrated to the elevational range to be supervised (such as 10,000 feet, as for example in Figure 1) and a linear dimension 12, representing the length of a sweep path that is traversed by a timing device in a basic, or reference, time interval.

The manner in which that relationship is established is shown in more detail in Figure 3, where the various elements are shown, schematically, of an altimeter or elevation-indicator 13 and a sweep timer 14.

The elevation-indicator 13 may be of any suitable form, and is illustrated here, by way of example, to show certain functional elements, such as an air-pressure-responsive bellows 15, or an equivalent aneroid cell, mounted on a support 16 and operative through a rack and pinion 17, or its equivalent, to angularly displace a shaft 18 and a pointer 19 relative to a calibrated scale 21, to indicate the equivalent elevation of the altimeter. The scale 21 is also mounted on the support 16. The pointer 19 carries a small permanent magnet 23 whose function is to generate a signal pulse in a pick-up coil connected to an external circuit, when the coil is swept past the magnet. The pulse is thus indicative of the position of the pointer 19, as the pick-up coil is periodically rotated past the magnet by an element of the timing device 14.

The timing device 14 is shown schematically as consisting of a synchronous motor 25, a drive shaft 26, and a driven element fixed on the shaft and shown here as a disc 27 provided with a radial slot 28. On the disc 27, radially aligned with the slot 28, is the pick-up coil 29 referred to, which may be provided with a core 24 to conduct more flux from the magnet 23. Behind the slot 28 a neon lamp 30 is mounted on the disc to illuminate the slot and cause it to serve as a stroboscopic pointer whenever the neon lamp is flash-lighted by an applied voltage pulse. In a different modification, two slots and two lamps are provided, as will be explained in Figure 6.

The function of the timing device 14 is to provide the basic or reference time interval that is to serve as the measuring stick for the system. That time interval is established as the time of one rotation of the disc 27. The disc may be direct-driven by the motor 25, or it may be geared up or down from the motor. The motor is shown as a synchronous motor, energized from an alternating current source, of a frequency that is standard for the entire system. The source may be a generator on each craft, or the energy may be supplied by modulating a carrier frequency from a ground source and picking off the modulation frequency on the aircraft.

Similarly, any functional equivalent for the synchronous motor might be used to rotate the disc, such as, for example, a clock or a direct-current motor, suitably controlled to operate at constant speed.

The operation of the system may now be considered by reference to the elements of Figures 3, 4, 5 and 6.

Assuming the aircraft to be flying at an elevation of 3,500 feet, the altimeter 13 will respond and move its pointer 19 to the dotted-line position indicated at 19a, in Figure 3, corresponding to 3,500 feet on the calibrated scale 21.

Assuming the synchronous motor 25 to be operating, it is rotating the disc 27 at a constant speed. The motor disc 27 is co-axially adjacent the calibrated scale 21 of the elevation-indicator, so one rotation of the disc 27 will sweep the calibrated indicator scale 21. As already stated, the angular movement of the disc 27 through one rotation is utilized as a dimensional equivalent of the duration of one reference time interval. As the disc rotates and moves the pick-up coil 29 past the magnet 23 on the altimeter pointer 19, a voltage pulse is generated in that coil each time the coil reaches a position 29a in alignment with the elevation-pointer 19 at its position 19a.

Thus, a voltage pulse will be generated at each rotation of the disc, always when the coil 29 passes the magnet 23. Each such voltage pulse is utilized to key a transmitter to cause the transmitter to emit a signal pulse, as shown in Figure 4. That signal pulse is received and detected by a suitable receiver on every other aircraft of the system in the traffic zone, and at nearby ground stations. The transmission and the reception of the signal pulse may be considered to be substantially instantaneous, when compared with the relatively long duration of a reference time interval corresponding to one rotation of the timing motor disc.

The operation of a mechanical form of the system is shown in simple schematic diagram in Figure 4. A signal pulse as transmitted from an external craft on an assigned high-frequency carrier that is standard for the system, is received locally on antenna 35, amplified by a suitable amplifier 36 and detected by suitable detecting means 37 to remove the signal pulse from the carrier.

The amplifier 36 and the detector 37 are indicated for simplicity merely as standard equipment for the functional operation of removing the superimposed or modulating pulse from its carrier frequency wave. Any standard receiver may be employed for this functional operation. The detected pulse is then applied to the neon lamp 30 for immediate instantaneous energization.

The neon lamp 30 is supported on or with the disc 27 and rotated therewith. Connections to the lamp are made through brushes and slip rings 38 on the driven shaft of the motor. Similarly, brushes and slip rings 39 are provided on the motor shaft for external connections to the pick-up coil 29.

Figure 5:
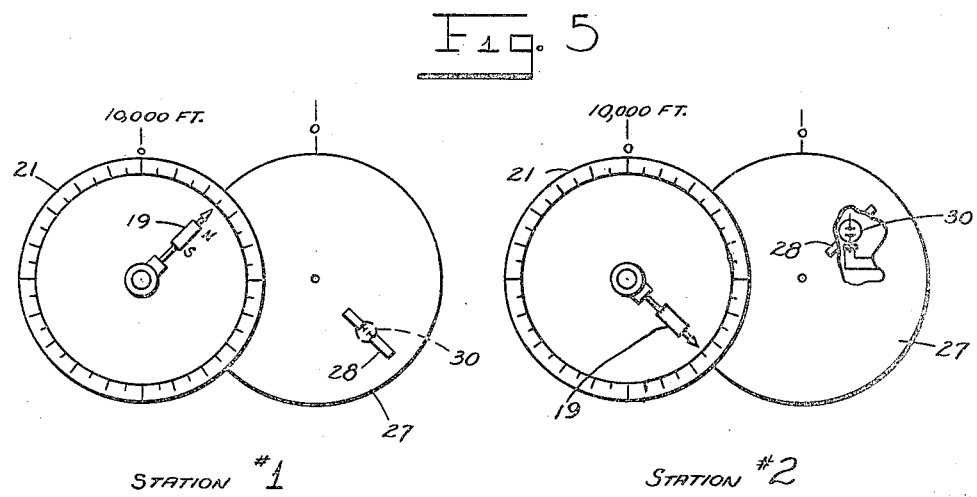
Figure 5 is a schematic view of two units, at separate stations, showing the relationship between the indicator units during operation.

Since all the motors and discs are similar, the operation at a remote equipment upon reception of a pulse from the local transmitter is the same as the operation that takes place at the local equipment shown in Figures 3, 4 and 5, upon reception of a similar signal pulse from an external transmitter. When that occurs, neon lamp 30 receives a signal energy pulse, and flash-lights and illuminates slot 28 for the instant duration of the signal pulse, which is of the order of time required for the pick-up coil 29 on the equipment of the external craft to move a few angular degrees as it passes its magnet 23.

Since the sequence of operations from pulse generation on one craft to flash-lighting of the neon lamp on the receiving craft is substantially instantaneous, the position of the slot when it is flash-lighted on the local or receiving craft will be practically the same as the position of the slot and the aligned pick-up coil on the external or sending craft, due to the operation of all the synchronous motors in synchronism and phase. Since the action is stroboscopic, the flash-lighted slot constitutes a lighted hand or pointer showing the corresponding position at which the pick-up signal pulse is generated on the sending craft. That pulse-pick-up position is also the position of the elevation-indicator pointer 19 on the sending craft. The slot position therefore shows the position of the altimeter pointer on the sending craft. The pilot of the receiving craft thus has a continuous indication of the elevation of the external craft.

Where many craft are in the adjacent region, each external craft will be sending a signal pulse according to its position, and all of those pulses will be collected and shown spaced in various positions on the disc of the equipment on each of the respective receiving craft, according to the instants of reception. These positions will correspond respectively to the elevations of the respective craft from which the signals emanate.

To show a pilot his own elevation, in one modification of the system, Figure 4, the locally-generated self-position pulse is applied to the neon lamp 30 as well as being applied to the transmitter circuit and an antenna 40 for transmission to other stations.

The location of the local pulse flash on the disc 27 will indicate the self-position of the craft by reference to the calibrated scale 21. The circuit for the local pulse to the neon lamp may be controlled by a switch 42 and a blocking condenser 43. The switch 42 may be of opening or closing type and is operable by the pilot to ascertain which one of several flashes on the disc is the one caused by the local pulse.

Figure 5 shows schematically how the system operates between two equipments, for example, numbered station #1 and station #2 for identification. The elevation of the craft identified as station #1 is indicated by #1 pointer 19, at about 2 o'clock on its elevation-indicator scale 21. At station #2, the elevation of station #2 is indicated at about 4 o'clock by its pointer 19.

The elevation of station #1, indicated by its pointer 19 at 2 o'clock position, is shown at station #2 by the illuminated slot in front of the neon lamp at 2 o'clock position.

Similarly, the elevation of station #2, indicated by its pointer 19, is shown at station #1 by the 4 o'clock position of the #1 neon lamp and slot.

If more craft are in the vicinity of the aircraft at stations #1 and #2, the slot will be flash-lighted at the respective positions for each of the other craft, in addition to the indications already referred to.

While reference is here made to equipment located on aircraft, it will be clear that the described altimeters or altitude-indicating equipment may be disposed at fixed stations, or on buildings or mountain tops, or at other points of terrain or construction that might be flying hazards. The altitude of each such equipment can then be broadcast, by the method and system shown herein, to those who should be informed, and such information received by them for their safe guidance.

Figure 6:
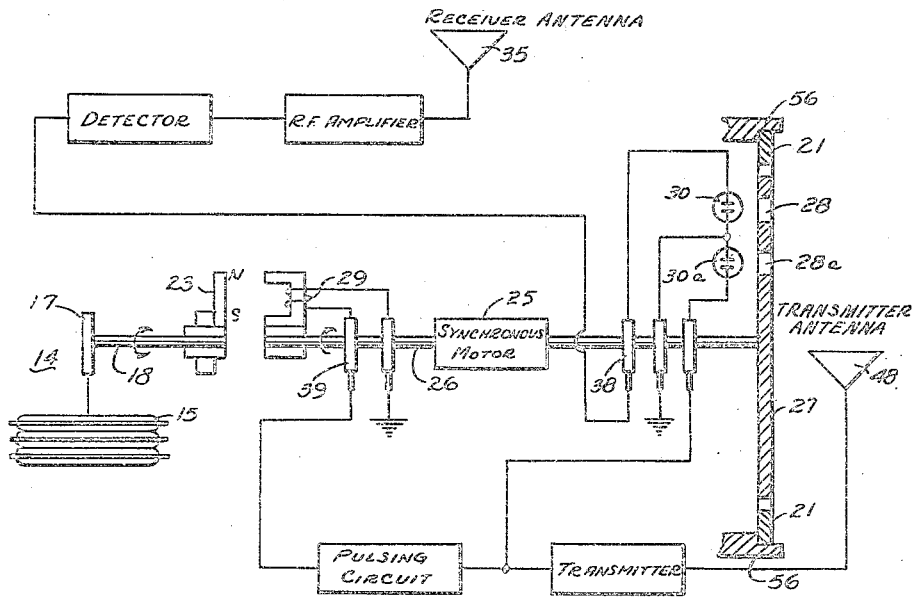
Figure 6 is a schematic and block diagram similar to Figure 4, but showing the use of a separate signal lamp to indicate self position.

In a second modification, Figure 6, a second neon lamp 30a is disposed behind a second slot 28a. Both slots are radially aligned. The first neon lamp receives external position-indicating pulses, and the second neon lamp is supplied with only the local pulses, and provides a continuous self-position indication, without any switch operation by the pilot. By disposing the two neon lamps and their slots at different distance from the center of rotation, confusion is avoided between the identity of the local pulse flash and of the flashes due to external pulses, and the pilot need not remember which is his own pulse indication.

For convenience and simplicity of explanation, it was assumed that the timing motors all operate both in synchronism and phase.

For proper operation, an assumed zero point on the disc should be at a specific point on its circle of rotation, at the beginning of a reference time interval that is measured by one rotation of the disc. As already stated, the beginning of that reference time interval should be physically in registry with the origin of the calibrated scale 21.

Actually, a synchronous motor starting from rest could achieve synchronous speed at an instant when its assumed zero point would be at a different point of its circle of rotation. The motors at the various stations would then operate in synchronism so far as speed is concerned but would not be in phase. Indications at a receiving craft would be out of phase by an angle corresponding to the out-of-phase angle at the sending craft. That would be the rotational angle between such assumed zero point on the disc and the point in space at the beginning of the time interval in registry with the origin of the calibrated scale 21.

To correct for such possible phase displacement, the equipment on each craft is adjusted at the beginning of each operating flight, by reference to a synchronizing signal pulse that is periodically transmitted to all aircraft from a ground station, on a carrier frequency that is standard for the system. The synchronizing pulse marks the beginning of each reference time interval, that is of constant duration for the system.

The synchronizing pulse is also arranged to be shown by the disc slot. The radius line of the slot may therefore be appropriately utilized as the locus of the zero point of the disc, by which the phase adjustment is to be made.

The phase adjustment is made by the pilot, after starting the motor, by angularly adjusting the motor frame and the altimeter relative to each other, to register the slot at the beginning of the altimeter scale. The synchronizing signal is preferably sent so it will be recognized on the disc by some characteristic, such as low frequency flicker, to distinguish it from the position-indicating pulses. The motor is then angularly adjusted to bring the slot position, where lighted by the synchronizing signal, into alignment with the origin or zero position of the calibrated scale. The adjustment may be made by angularly adjusting either the motor or the altimeter. By way of example, the adjustment illustrated herein is by angular adjustment of the motor frame. That angular adjustment also adjusts the disc angularly since the synchronous operating relationship between the frame as a stator and the disc as part of the rotor is fixed, once the motor reaches synchronous operating speed and locks into step.

After such phase adjustment, the motor and the altimeter will be in proper phase relation, with the reference time interval registered with the calibrated scale 21. The position-indicating signal pulses will then have significance when read on the calibrated scale 21.

Figure 7:
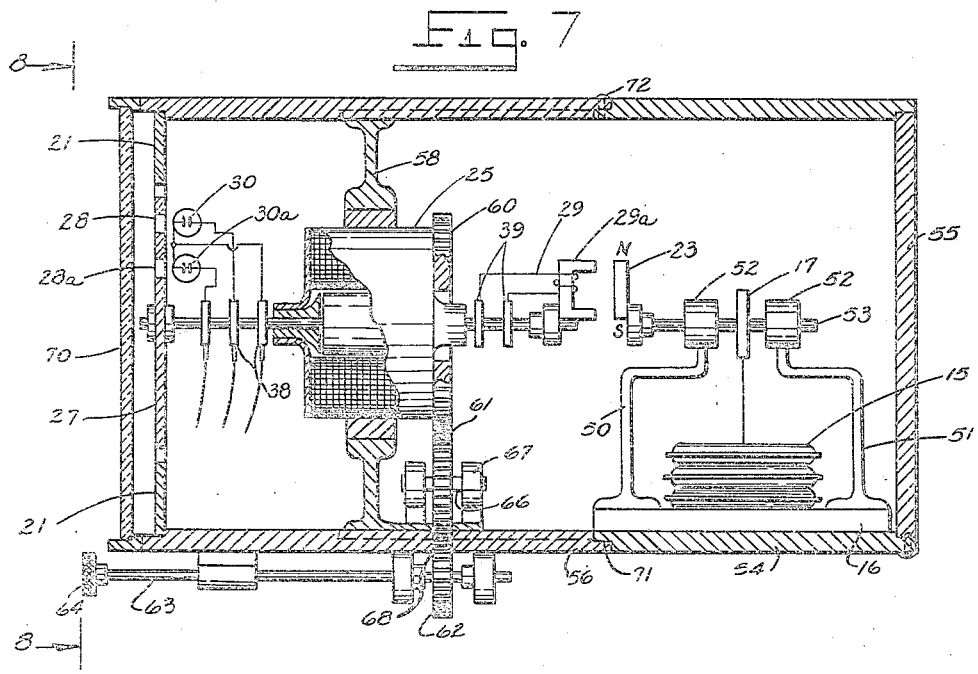
Figure 7 is a side view of an elevation indicator, partially in elevation, partially in section, and with parts broken away to show the elements collected into one casing as a unit, to permit mounting on an instrument panel.

In the complete indicator as shown in Figure 7, the altimeter is normally constructed as a unit on its own supporting base or bracket so that it may be then assembled as a unit without requiring any further adjustment of any of its parts. As is shown, the entire unit consists of one or more aneroid discs 15, which serve to move an arm 17 axially, to a position corresponding to the ambient pressure surrounding the discs. Two brackets 50 and 51 are provided to support two bearings 52 in which a rotatable shaft 53 is disposed to be angularly moved by the arm 17. The rotatable shaft 53 supports the electromagnet 23 and serves to position the electromagnet 23 in its path at a position corresponding to the elevation.

The altimeter unit, as a whole, is disposed in the back section 54 of the casing, which is closed at the back by a suitable closure disc 55, after the altimeter unit is properly mounted and secured to the casing section 54.

The timing motor and its associated elements are disposed in a front section 56 of the casing arrangement for angular adjustment of the motor 25 is provided by supporting the motor in a bearing mounted on a bracket 58 secured to the casing section 56. A gear 60 is secured to the motor frame coaxially with the shaft of the motor. An idler gear 61 engages the gear 60, and the idler is engaged by a driving pinion 62 supported on an adjusting shaft 63. The front end of the adjusting shaft 63 has an adjusting button 64 attached thereto for use by the pilot to rotate shaft 63 and angularly position the motor to bring the lighted slot of the disc into proper phase position with the calibrated scale. The idler gear 61 is supported on a shaft 66 which is supported between two bearings 67 that in turn are disposed on and supported on the same mounting bracket 58 which supports the bearing 57 for the motor.

The idler gear 61 is of such dimension as to clear the inside of the casing section 56 to permit easy assembly of the motor and its supporting bracket as a unit. Access to the idler gear 61 is provided through a slot 68 in the casing section 56 to permit the driving pinion 62 to be placed into meshing engagement with the idler 61.

The front end of the shaft of motor 25 carries the three slip rings 38 and the slotted disc 27. The two neon lamps 30 and 30a are also supported at the same end of the motor shaft respectively behind their associated slots 28 and 28a. The lamps are connected to the slip rings, as indicated to permit connections to be made to external circuits. The disc 27 is surrounded by an annular scale 21 which is calibrated according to the range of elevation to be supervised by the instrument. The front end of the casing is enclosed by a glass cover 70 and the two sections of the casing 54 and 56 are arranged to be nested as shown at shoulder 71 to permit the two sections to be assembled after the altimeter and the motor have been mounted in their respective sections. The two sections may then be pinned together by screws 72 or other equivalent means.

As viewed from the front of the instrument only the calibrated scale 21 will be visible when the motor is operating and the lamps are not flash-lighted. When either lamp is flash-lighted it will illuminate its associated slot 28 or 28a, or if both lamps are lighted the two slots will appear as lighted lines, radially directed to the value on the calibrated scale corresponding to the elevation of the equipment from which the signal was received to illuminate either slot at that point. As already explained, the self-position indicating signal will illuminate slot 28a whereas the externally received signals will illuminate the outer slot 28. The synchronizing signal will be received at the outer slot 28 and the pilot will recognize it by its flicker appearance. He may then adjust the motor by rotating the adjusting button 64 to turn the motor angularly to a position at which the illuminated slot 28 will be aligned with the zero reading on the altimeter scale 21. When the disc is adjusted to that position, the motor is in proper phase position and in synchronism with the other motors of the system, so that illumination of the slot thereafter will have true position-indicating significance.

Figure 9:
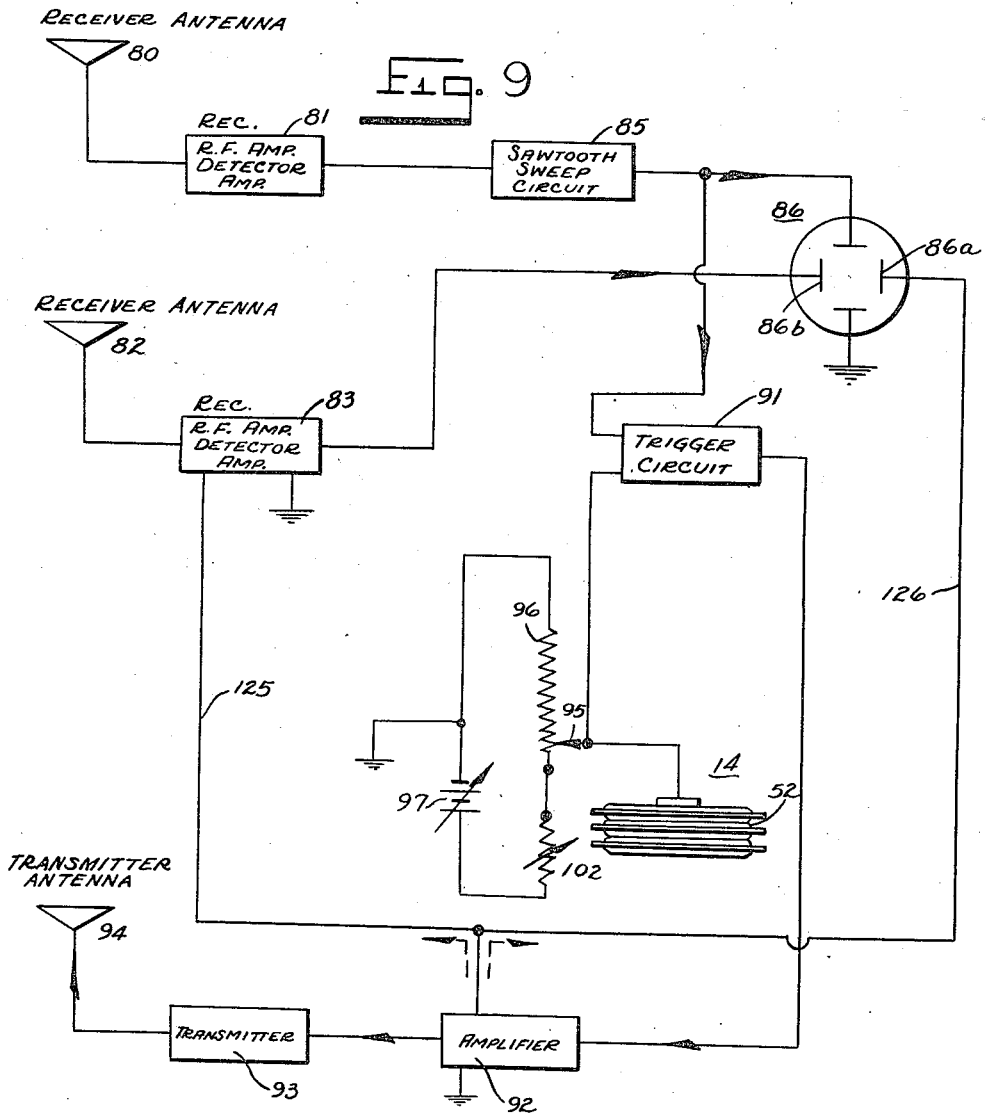
Figure 9 is a block diagram of a circuit at one station of the system, for use with a cathode ray tube indicator.
Figure 10:
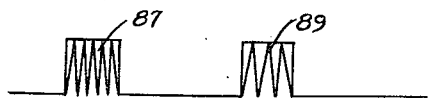
Figure 10 illustrates two types of pulses that may be used, one for synchronizing and the other for position indicating.

In Figure 9 is shown a simplified block diagram of a similar position or elevation system operating and controlled electronically. For identification, the synchronizing pulses and the position-indicating pulses should have different characteristics. Each pulse is superimposed on a high frequency carrier of different frequency, as indicated in Figure 10. The synchronizing pulse may originate at a ground station of the system, or it may be derived from a standard time signal from an independent source. The position- indicating pulse will be transmitted on an allocated carrier frequency.

To simplify the description of the operation of the system, two separate reception channels are shown. The synchronizing pulses 87 are received on an aerial 80 and fed to a receiver 81 having the usual radio amplifier and detecting equipment and suitable tuning or selected frequency filtering equipment. Upon detection, the synchronizing pulse is fed to a saw-tooth oscillator controlling a sweep circuit 85 to initiate a sweep voltage to be applied to the vertical deflection plates of a cathode ray tube 86 to establish a constant repetitive time base. The synchronizing pulse thus controls the starting of the saw-tooth oscillator 85 to establish the starting point of the reference sweep time interval of the base line trace between the vertical plates of the cathode ray tube 86. The positioning of the trace and the adjustment of its length may be controlled by the usual adjustments of the tube 86.

The position-indicating pulse 89 is received through an aerial 82 and a receiver 83 and after detection and suitable amplification is supplied to one horizontal deflection plate of the oscilloscope.

Since the synchronizing pulse will control the starting point of the reference sweep time intervals on all craft, the sweep actions will all be synchronized and kept in phase by adjustment of the sweep trace length to the calibrated base line length at the screen of the cathode ray tube 86. The position-indicating pulse will horizontally deflect the swept vertical trace for the duration of the pulse, at the instant of reception. The vertical distance of the pulse from the origin of the trace will be proportional to the elevation of the equipment from which the pulse originated.

The manner in which the local position-indicating pulse 89 is initiated may be understood from consideration of the block diagram of Figure 9. The same sweep voltage from the sweep circuit 85 is used to control a trigger circuit 91 according to the position of the elevation indicator. The trigger circuit provides a pulse which is amplified by an amplifier 92 and then used to modulate a transmitter 93 connected to a sending aerial 94.

Figure 12:
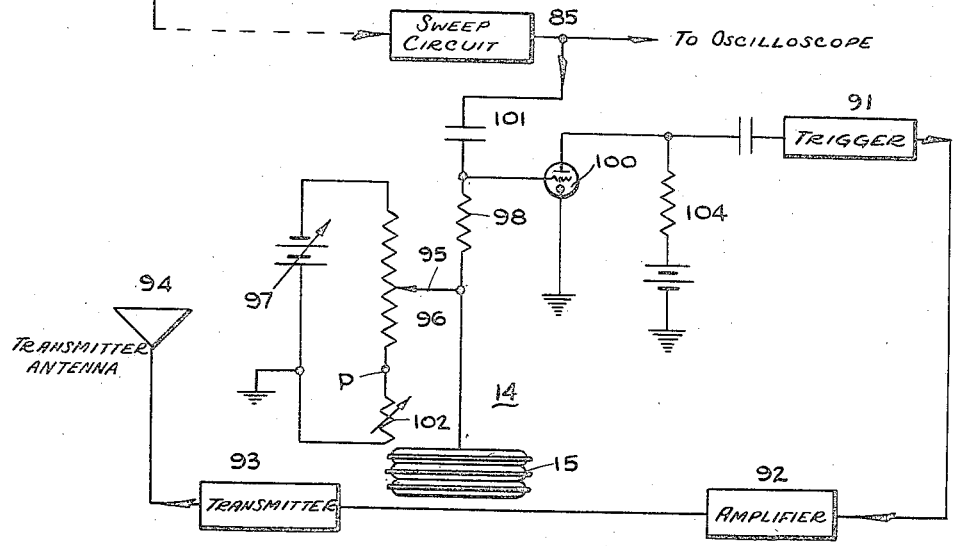
Figure 12 is a diagrammatic and block circuit diagram showing the manner in which the pulsing action is achieved to indicate the position of the pointer of an altimeter.

The arrangement of the trigger circuit 91 is shown in more detail in Figure 12. The aneroid cell 15 of the elevation-indicator 14 moves its pointer as a contact arm 95 along a potentiometer 96 that is energized from a voltage source 97. The contact arm is connected through a grid resistor 98 to the grid of an amplifier 100, shown for simplicity as a triode. The grid is also connected through a blocking condenser 101 to the output terminal of the sweep circuit 85, so the sweep voltage of circuit 85 will be periodically and repetitively applied to the grid through the condenser.

When the equipment is at zero or sea level, the grid is biased to cut-off by an auxiliary resistor 102 in the potentiometer circuit. At that elevation the contact arm is at the lower end of the potentiometer 96, at point P. As the elevation of the equipment increases, the contact arm 95 rises and impresses more negative bias on the amplifier grid. The amplifier will not conduct until the grid bias is increased to a potential more positive than the cut-off value. The grid thus serves to compare the negative bias imposed by the potentiometer arm 95, and the positive voltage imposed by the sweep circuit 85. When the sweep voltage equals the negative bias, the tube is at cut-off. An immediate slight increase in sweep voltage on the grid renders the tube conductive to drive the trigger circuit 91 to generate a pulse that is then amplified and used to modulate the transmitter, as shown in Figure 9. The pulse from the transmitter is thus transmitted substantially at the instant the value of the sweep voltage equals the value of the potentiometer voltage at the point of contact of the arm 95. That point in the time interval of the sweep voltage is the same at all stations. This is further shown in the schematic graph of Figure 11.

Figure 11:
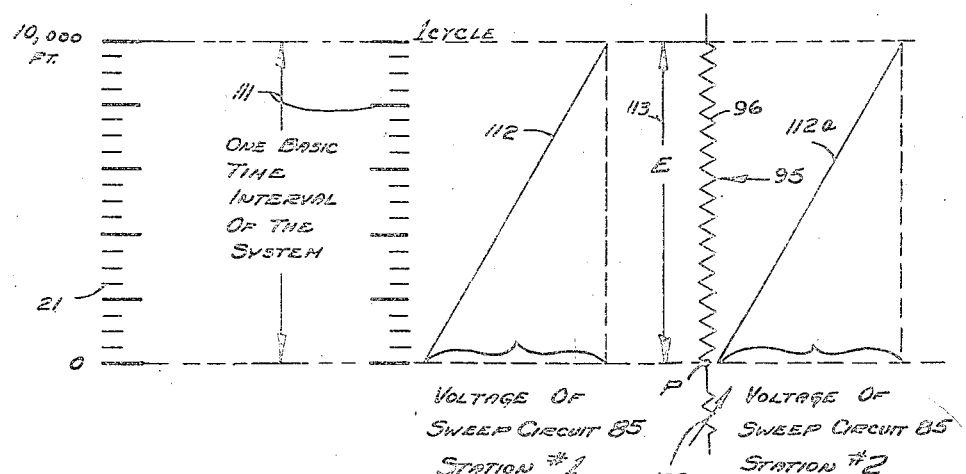
Figure 11 is a schematic graph, illustrating the relationship between the linear dimension of the calibrated scale, the equivalent physical linear dimension of a reference time interval as established for and to be traversed by a movable element of a timing device, the value and the time interval of a sweep timing voltage, and the voltage drop across a potentiometer.

Figure 11 shows the relationship between several functions employed in the system.

The calibrated scale 21 of the altimeter provides the linear dimension to which the reference time interval 111 is to be related. The time interval is established over a path of the same dimension as the scale, and to be traversed by a timing element, such as the path of one rotation in the case of the motor, or the length of the vertical timing trace in the case of the cathode ray tube.

The saw-tooth sweep voltage established by the sweep circuit 85 in Figure 9, is represented by the line 112, which is indicated as being a straight line, although not strictly so. For the purpose of this system the inaccuracy is small enough to be disregarded. The maximum value of the saw-tooth sweep voltage that may be generated, or used, determines the value of the energizing voltage E 113 that is to be made available across the potentiometer 96 from the source 97. That source must also supply the additional drop across resistor 102 which provides cut-off bias to tube 100.

The contact arm 95 is adjusted by the aneroid discs according to altitude. The potential of the contact point above the bottom point P of the potentiometer is therefore a measure of the altitude, as indicated on scale 21 on a line parallel to the base line of Figure 11.

The duration of the sawtooth sweep voltage 112, or the time required for it to reach its maximum value when starting from zero, may be adjusted by varying the constants of the sweep circuit. Since the maximum voltage to be generated by the sawtooth sweep voltage is equal to the voltage which is impressed across the potentiometer 96, the potential at any point corresponding to the contact 95 on the potentiometer 96 will be equal to a potential to be reached by the sweep voltage at a point opposite the contact 95 on a line parallel to the base line in Figure 11.

Since the reference time interval 111 equals the time required for the sweep voltage 112 to reach its maximum and both are substantially linear, the sweep voltage 112 will have a point of potential corresponding to the potential at the point of contact on the potentiometer 96, and the reference time interval will have a corresponding point of time at a point where the same parallel intersects the time reference line 111.

Similarly that point on the time reference calibration 111 corresponds to a similar point opposite it on the calibrated scale 21. Thus the potential at the contact 95 on the potentiometer 96 corresponds to a potential of the sweep voltage 112 and to a point on the reference time interval 111 and to a point representing elevation on the scale 21.

As utilized in Figure 12, the potential at contact 95 is negative relative to the base point P and the potential of sweep voltage 112 is positive, but for purposes of explanation of Figure 11, the polarities may be disregarded.

As previously explained, when a positive potential impressed on the grid of tube 100 by the sweep voltage 112 is equal to the negative potential impressed on the grid by the contact 95 on the potentiometer 96, those two voltages will neutralize so that the tube bias will be at its cutoff point due to the potential across the biasing resistor 102. As the sweep voltage continues to increase, the bias decreases and the triode 100 becomes conductive to energize its load resistor 104 and the trigger circuit 105, and cause a pulse to be transmitted over the aerial 94.

Figure 13:
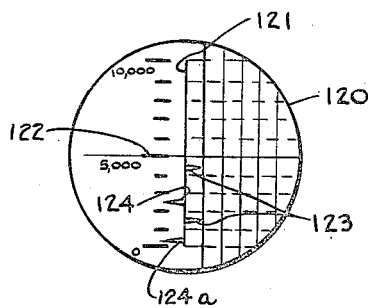
Figure 13 is a front view of the screen of a cathode ray tube controlled to show a vertical trace.

Figure 13 shows the appearance of the cathode tube screen 120 with a vertical trace 121 shown representing the sweep voltage 112 of Figure 11. The vertical timing trace 121 which serves as the reference time base, is adjusted by varying the constants of the sweep circuit 85 to the cathode ray tube, to register the beginning of the trace at the origin of the calibrated scale adjacent the tube screen. Calibrated scale 122 in this case corresponds to the calibrated scale 21 of the rotary type equipment of the first mechanical modification. In order to permit identification of the signals from the external craft, the receiving signals from external craft are preferably indicated on one side of the vertical baseline trace 121, and the self-indication pulse 124 is indicated on the other side of the vertical trace. In order to provide for the self-indicating pulse 124, a pulse voltage from the amplifier 92 is applied to the horizontal right-hand plate of the tube 86, while the pulse voltage is simultaneously applied, through conductor 125, as a blocking bias voltage to the receiver 83.

The pulse voltage from amplifier 92 to tube 86, through conductor 126, has its return ground connection through the left-hand horizontal plate of tube 86 and the output circuit of receiver 83. Thus, the right-hand plate 86a of the cathode ray tube 86 is positive when the self-position signal is applied to tube 86, but when external signals are applied, from receiver 83, the left-hand plate 86b is positive. The return circuit then is through plate 86a, conductor 126, and output circuit of amplifier 92 to ground.

Figure 14:
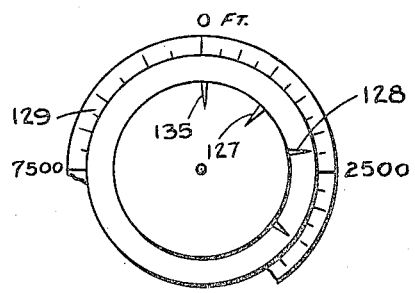
Figure 14 is a similar view of a cathode ray tube controlled to show a circular trace, with the local pulse and the external pulses on opposite sides of the trace.

For a circular trace, a polar tube is utilized. Self-position is indicated by inner pip 127 and the elevations of external craft by outer pips 128. A calibrated scale 129 is disposed annularly around the display surface of the tube. To obtain the display shown in the Figure 14, a circuit as in Figure 15, is used, which is similar to Figure 9 except with the addition of elements to provide a circular trace. In Figure 15 the polar tube 130 has its main terminals supplied with a voltage from a phase splitter circuit 131 consisting of a resistor 131a and a condenser 131b. The constants of this circuit are made such that the voltages applied to the respective pairs of plates will be 90 degrees out of phase.

Energy for the tube may be derived from a low frequency voltage, such as sixty cycles. This frequency may be generated locally on a craft, or picked off as a modulation frequency on a carrier from a local station. As shown in Figure 15, such a modulation frequency after being segregated by the receiver is passed through the phase changer 132 to permit phase adjustment of the sixty cycle wave to a position where a superimposed synchronizing pulse on the sixty cycle wave will register with the zero position of the circular trace on the cathode ray tube 130, at the origin of scale 129. The receiver which receives the position-indicating pulse is connected to the center electrode 136 of the polar tube 130. An incoming position-indicating pulse will thus cause a radial pip in the circular trace. The angular position of the pip relative to the zero position of the circular trace, when read on the calibrated scale, will indicate the elevation of the aircraft from which the signal was sent.

In order to insure that the circular trace is in proper phase, a phase changer 132 is provided to permit the circular trace to be rotatably shifted until the synchronizing pulse 135 on the trace is aligned with the origin of scale 129. The reference timing interval of the circular trace is then in registry with the calibrated scale 129. When all of the tubes in the system are thus connected, all corresponding indications on the several tubes are in synchronism and in phase.

A self-position indicating pulse 127 is derived from the local associated altimeter, which may be of the mechanical type shown, or of any equivalent electronic type which will provide a voltage pulse whose relation to a reference time base corresponds to the elevation as measured.

A sweep circuit 139 is periodically initiated by the synchronizing pulse from the phase shifter 132, and caused to impress a saw-tooth sweep voltage on the grid of tube 100 through condenser 101, in the manner explained in Figure 12. A self-position pulse from trigger circuit 91 as amplified by amplifier 92 is fed to an appropriate stage of the amplifier 140, through a circuit indicated by the dotted lines 141, to energize the polar electrode 136 with voltages of polarity opposite to that of the incoming position pulses, so the self-position pulse 127 will point radially inward from the circular trace for ready identification.

A directional or sense indication of the source or sources of the external elevation-indicating pulses may be obtained by use of a combination loop and sense antenna or double coil antenna. The pilot may thus ascertain the relative directional location of a pulse-transmitting source or aircraft whose elevation is indicated to be dangerously close to his own elevation. The relative variation of the strength of the signal pulse will also serve to indicate his approach to or separation from said source.

As shown in Figure 16, the instrument comprises the usual pointer 150, and a calibrated scale 151. As shown also in Figure 17, the pointer is normally mounted on a shaft 153 that is operated by suitable mechanism of the instrument, which need not be shown here. The pointer 150 or the shaft 153 serves to support one magnet 154 which is to provide the magnet flux to permit a pick-up coil to generate a pulse for signalling purposes, as previously described.

The front of the instrument is covered by the usual glass cover 155 which closes the case to dust, dirt and other foreign materials.

The instrument as shown in Figures 16 and 17 may embody its normal construction and design as adapted for its usual commercial application, and need be modified only to the extent of the addition of the small magnet 154. Physical access to the parts within the casing is therefore not necessary since the magnet 154 on the pointer 150 will provide, inductively, an indication of its position.

The location of the magnet on the instrument may be determined by a suitable search coil, on a rotating shaft 160 driven by a motor 160 as, for example, in Figures 6 and 7. In this case a disc 163 may be utilized or not, depending upon the use to be made of the instrument, i. e., whether it is to provide a local indication or merely to provide a long-distance indication. If a local indication is to be provided, the disc 163 will be provided with a slot 164 and a neon lamp 165 for the purposes already explained. Access to the coil and to the neon lamp will be through slip-ring and brush combinations 166 and 167, respectively, to permit connections to external circuits. The pulse generated in the pick-up coil 162 upon rotation, will be supplied to a pulsing circuit 170, from which pulsing energy amplified by amplifier 171 will be supplied to a suitable transmitter 172 connected to a transmitting aerial 173, to radiate a pulse on a carrier of a high frequency that has been assigned to the operation of this system.

Figure 8:
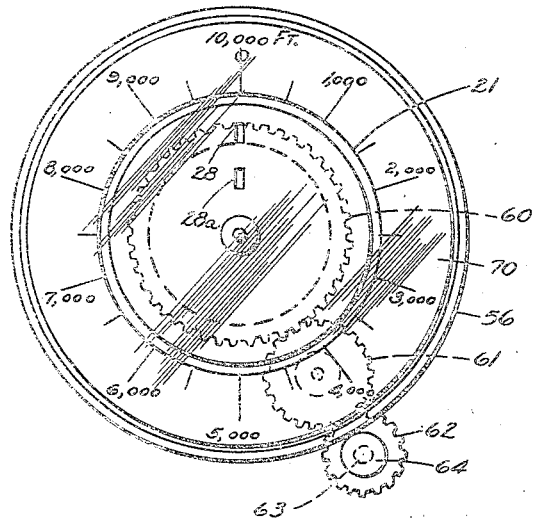
Figure 8 is a front end elevational view of the unit in Figure 7.

The energy from the transmitting aerial 173 will be picked up by a receiving aerial 175 and supplied to a radio frequency circuit tuned to the frequency of transmission of the system, and the pulse then detected by suitable detecting equipment 177 and supplied to a neon lamp 178, supported on an arm or disc 179 driven by a synchronous motor 180 that is rotating at the synchronous driving speed. A slot 181 in the disc 179 will provide a reading on a calibrated scale 182 that will indicate the position of the pointer on the indicating instrument in Figure 16, the calibrated scale 182 being calibrated in the same manner as the scale 151. Energy for the two synchronous motors will be supplied from two circuits of the same frequency, for example 184 and 185, so that synchronous speed is guaranteed. Phasing adjustment of the two motors 160 and 180 may be made at each end of the system in a manner already described in connection with the equipment in Figures 7 and 8.

Our invention thus contemplates the use of a reference time base as a measuring medium, against which other quantities may be measured upon conversion of the quantities to time functions.

The invention is not limited to any of the specific details of construction that may be illustrated, since these are merely for illustrative purposes. Various modifications may therefore be made of the construction detail and in the arrangement of the circuits without departing from the spirit and scope of the invention as it is set forth in the appended claims.

We claim:

1. In combination, means at each of a plurality of stations for generating a periodic time base common to said stations and for generating a signal timed with respect to said periodic time base common to said stations in accordance with the value of a measurable quantity, a further station comprising an indicator, said indicator comprising an element moving periodically over a predetermined path in synchronism with repetitions of said periodic time base, means for transmitting said generated signals from each of said plurality of stations to said further station, means at said further station for receiving said signals and for applying said signals to said indicator, said indicator being arranged to provide a visual indication in response to each application of one of said signals thereto at the then position of said moving element.

2. In combination, means for establishing a similar periodically recurrent time base at each of a plurality of stations, means at each of said stations for generating signals timed with respect to said time base in accordance with the value of a measurable quantity, an indicator at each of said stations for indicating the timing of signals applied thereto with respect to said time base, means for transmitting said generated signals from each of said stations to the remainder of said stations, means at each of said stations for receiving said transmitted signals, and means for applying signals received at each station to said indicator at each station.

3. The combination in accordance with claim 2 and further comprising means at each station for applying the signals generated at said station to the indicator at said station for indicating the time positions of the last mentioned signals with respect to said recurrent time base.

4. The combination in accordance with claim 2 wherein said indicator at each of said stations comprises a cathode ray tube indicator means having ray deflecting electrodes and ray modulating electrodes, means for periodically deflecting said ray in synchronism with recurrences of said recurrent time base, and means for modulating said ray in response to application of said signals to said indicator.

5. The combination in accordance with claim 2 wherein said indicator at each of said stations comprises a cathode ray tube means having ray deflecting means for circularly deflecting said ray in synchronism with recurrences of said recurrent time base, said cathode ray tube means further comprising means for modulating said ray in response to application of said signals to said indicator.

6. The combination in accordance with claim 2 wherein said indicators comprise each a mechanically space scanning element synchronized with recurrences of said recurrent time base, said indicators being each responsive to signals derived from one of said means for receiving for providing visual indications at the instantaneous positions of said space scanning element which correspond with the times of reception of said signals.

7. The combination in accordance with claim 2 wherein said transmitted signals are short pulses of radio frequency energy.

8. A method of telemetric communication comprising the steps of: establishing a common time base at a plurality of stations, generating a pulse at each of said stations having a time position with respect to said common time base determined in accordance with the value of a measured quantity, establishing a correspondence between times along said time base and points along a line in space at each of said stations, and indicating the time positions of said pulses by reference to said line at each of said stations.

9. A method of telemetric communication from a plurality of stations to a central station, comprising the steps of: establishing a common time base at said plurality of stations and at said central station; generating a pulse at each of said plurality of stations, each of said pulses having a time position with respect to said common time base which is indicative of the value of a measurable quantity, establishing a correspondence between time positions along said common time base and points along a line in space at said central station, and indicating the time positions of each generated pulse at said central station by reference to said line in space.

10. In combination, means for establishing a similar periodically recurrent time base at each of a plurality of stations, means at each of said plurality of stations for generating a signal timed with respect to said time base in accordance with the value of a measurable quantity, an indicator at each of said stations for indicating timing of signals with respect to said time base, means for transmitting said signals from each of said stations to the remainder of said stations, and means at each station for receiving signals from the remainder of said stations and for applying said signals to the indicator at said each station.

11. In combination, a first cathode ray tube indicator having means for generating a cathode ray beam and an indicating surface visually responsive to impact by said beam, means for recurrently and periodically causing said cathode ray beam to scan said indicating surface, said last means comprising a source of saw-tooth voltage, means for measuring the magnitude of a first physical quantity, means responsive to said last means for establishing a direct current voltage proportional to said magnitude, means responsive jointly to said saw-tooth voltage and to said direct current voltage for generating a first pulse timed in accordance with said magnitude, first means for transmitting said first pulse to a remote location, a second cathode ray tube at said remote location having means for generating a cathode ray beam and an indicating surface visually responsive to impact by said cathode ray beam, means for recurrently and periodically causing said second named cathode ray beam to scan said second named indicating surface, said last means comprising a source of saw-tooth voltage, means for measuring the magnitude of a further physical quantity at said remote location, means responsive to said last means for establishing a direct current voltage proportional to said magnitude, means responsive jointly to said last named saw-tooth voltage and to said last named direct current voltage for generating a further pulse timed in accordance with said magnitude of a further physical quantity, means for transmitting said further pulse from said remote location, means at said first cathode ray tube indicator responsive to said second pulse for modulating said cathode ray beam of said first cathode ray tube, means at said second location responsive to said first mentioned pulse for modulating said second named cathode ray beam, and means for synchronizing said means for recurrently and periodically causing said cathode ray beams to scan said indicating surfaces.

12. In combination, a cathode ray tube indicator having an indicating surface, a source of saw-tooth voltage, means for establishing recurrent traces on said surface comprising said source of saw-tooth voltage, means for measuring the magnitude of a physical quantity and for establishing a D. C. voltage having an amplitude proportional to said magnitude, pulse generating means responsive to said last mentioned voltage and to said saw-tooth voltage for generating a pulse at a time during said recurrent trace which is representative of said magnitude, means for transmitting said pulse to a remote point, and means at said remote point for indicating said magnitude, said pulse generating means comprising a gaseous conduction device, means for maintaining said gaseous conduction device off-biased in response to said D. C. voltage, and means for applying said saw-tooth voltage to said gaseous conduction device as an on-bias voltage.

13. In combination, a cathode ray tube indicator having means for generating a cathode ray beam and an indicating surface visually responsive to said cathode ray beam, means for recurrently and periodically causing said cathode ray beam to scan a circular trace on said indicating surface, a saw-tooth voltage generator, means for controlling said saw-tooth voltage generator to initiate generation of saw-tooth voltage waves periodically in synchronism with said circular traces, means for measuring the magnitude of a physical quantity, means responsive to said last means for establishing a direct current voltage having an amplitude proportional to said magnitude, means responsive jointly to said saw-tooth voltage and to said direct current voltage for generating a pulse timed in accordance with said magnitude, and means for transmitting said pulse.

14. In combination, a cathode ray tube indicator having an indicating surface, means for establishing recurrent traces on said surface, said means comprising a saw-tooth voltage generator, means for measuring the magnitude of a physical quantity and for establishing a voltage having an amplitude proportional to said magnitude, pulser means comprising a gaseous conduction device responsive to said last mentioned voltage and to said saw-tooth voltage for firing to generate a pulse at times during said recurrent traces representative of said magnitude, means for transmitting said pulses to a remote point, and means at said remote point for indicating said magnitude.

15. In combination, means for establishing corresponding mutually synchronized periodically recurrent time bases at each of a plurality of aircraft, means aboard each of said aircraft for generating a pulse timed with respect to said time base in accordance with the altitude of said aircraft, an indicator means on each of said aircraft for indicating timing of pulses with respect to said time base, means for transmitting said pulses from each of said aircraft to the remainder of said aircraft, and means at each of said aircraft for receiving said pulses from the remainder of said aircraft and for applying said signals to said indicator at each of said aircraft, visually to indicate the relative altitudes of said plurality of aircraft.

16. In combination, means at each of a plurality of aircraft for generating a periodic time base common to said aircraft, and for generating at each aircraft a signal timed with respect to said periodic time base common to said aircraft in accordance with the value of altitude of said each aircraft, a further station comprising an indicator, said indicator comprising an element moving periodically over a predetermined path in synchronism with repetitions of said periodic time base, means for transmitting said signals from each of said plurality of aircraft to said further station, means at said station for receiving said signals and for applying said signals to said indicator, said indicator being arranged to provide a visual indication in response to each application of one of said signals thereto at the then position of said moving element.

17. In combination, means for establishing an identical periodically recurrent time base at each of a plurality of aircraft, means at each of said aircraft for generating signals timed with respect to said time base in accordance with the value of altitude of said aircraft, an indicator at each of said aircraft for indicating the timing of signals applied thereto with respect to said time base, means for transmitting said signals from each of said aircraft to the remainder of said aircraft, means at each of said aircraft for receiving said transmitted signals, means for applying signals received at each of said aircraft to said indicator at each of said aircraft, and further means at each of said aircraft for applying signals generated at said aircraft to the indicator at said aircraft, for indicating time positions of said last mentioned signals with respect to said recurrent time base.

18. In combination, a cathode ray tube indicator having means for generating a cathode ray beam and an indicating surface responsive to said cathode ray beam, means for recurrently and periodically causing said cathode ray beam to scan said indicating surface, said last means comprising a source of saw-tooth voltage, means for measuring the magnitude of a physical quantity, means responsive to said last means for establishing a direct current voltage having an amplitude proportional to said magnitude, pulser means responsive jointly to said saw-tooth voltage and to said direct current voltage for generating a pulse timed in accordance with said magnitude, and means for transmitting said pulse, wherein said pulser means comprises a gaseous conduction device having a control electrode, wherein said direct current voltage is applied to bias said control electrode, and wherein said saw-tooth voltage is superposed on said direct current voltage, said gaseous conduction tube being arranged to fire upon attainment of a predetermined relation between the magnitudes of said direct current voltage and said saw-tooth voltage.

MARCEL WALLACE.
WILLIAM IEU-LIANG WU.

REFERENCES CITED

The following references are of record in the file of this patent:

UNITED STATES PATENTS

| Number | Name | Date |
|---|---|---|
| 2,084,760 | Beverage | June 22, 1937 |
| 2,090,359 | Robinson | Aug. 17, 1937 |
| 2,203,995 | Main et al. | June 11, 1940 |
| 2,252,083 | Luck | Aug. 12, 1941 |
| 2,301,929 | Budenbom | Nov. 17, 1942 |
| 2,321,605 | Keinath | June 15, 1943 |
| 2,321,971 | Becker | June 15, 1943 |
| 2,378,604 | Wallace | June 19, 1945 |
| 2,400,309 | Kock | May 14, 1946 |
| 2,402,688 | Scurnick | June 25, 1946 |
| 2,403,890 | Johnson | July 9, 1946 |
| 2,407,336 | Young, Jr. | Sept. 10, 1946 |
| 2,415,981 | Wolff | Feb. 18, 1947 |
| 2,421,785 | Hathaway | June 10, 1947 |